(12) United States Patent
Dixon et al.

(10) Patent No.: US 8,700,943 B2
(45) Date of Patent: Apr. 15, 2014

(54) CONTROLLING TIME STAMP COUNTER (TSC) OFFSETS FOR MULITPLE CORES AND THREADS

(75) Inventors: Martin G. Dixon, Portland, OR (US); Jeremy J. Shrall, Portland, OR (US); Rajesh S. Parthasarathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1025 days.

(21) Appl. No.: 12/644,989

(22) Filed: Dec. 22, 2009

(65) Prior Publication Data

US 2011/0154090 A1 Jun. 23, 2011

(51) Int. Cl.
*G06F 1/12* (2006.01)
*G06F 15/16* (2006.01)

(52) U.S. Cl.
USPC ........... 713/375; 713/300; 713/321; 713/400; 713/401

(58) Field of Classification Search
USPC ......... 713/300, 321, 375, 400, 401, 500, 501, 713/502, 503, 600, 601
See application file for complete search history.

(56) References Cited

U.S. PATENT DOCUMENTS

| 6,823,516 | B1 | 11/2004 | Cooper | |
|---|---|---|---|---|
| 7,043,654 | B2 | 5/2006 | Khondker | |
| 7,921,317 | B2 * | 4/2011 | Malek | 713/375 |
| 8,122,278 | B2 * | 2/2012 | Salam et al. | 713/503 |
| 8,139,069 | B1 * | 3/2012 | Molnar et al. | 345/505 |
| 2004/0049706 | A1 | 3/2004 | Strong | |
| 2007/0260907 | A1 | 11/2007 | Dixon et al. | |
| 2009/0222683 | A1 | 9/2009 | Serebrin et al. | |
| 2009/0222684 | A1 | 9/2009 | Serebrin et al. | |
| 2010/0058095 | A1 * | 3/2010 | Malek | 713/375 |
| 2010/0275053 | A1 * | 10/2010 | Salam et al. | 713/503 |

FOREIGN PATENT DOCUMENTS

CN 101135929 3/2008

OTHER PUBLICATIONS

IP.com, "Method for a Timer Architecture With an Interrupt Controller Timer and a Virtualization Timer for Low-Power States," 2006, pp. 1-3.
Intel, "Intel 64 and IA-32 Architectures Software Developer's Manual, vol. 3A: System Programming Guide, Part 1," Sep. 2009, 63 pages total.
Intel, "Intel 64 and IA-32 Architectures Software Developer's Manual, vol. 3B: System Programming Guide, Part 2," Sep. 2009, 40 pages total.
Patent Cooperation Treaty, Notification of Transmittal of the International Search Report and the Written Opinion of the International Searching Authority mailed Jul. 28, 2011 in the international application No. PTC/US2010/056165.
The State Intellectual Property Office of the People's Republic of China, Office Action mailed Oct. 30, 2012 in Chinese application No. 201010620032.3.

* cited by examiner

*Primary Examiner* — M Elamin
(74) *Attorney, Agent, or Firm* — Trop, Pruner & Hu, P.C.

(57) ABSTRACT

In one embodiment, the present invention includes a method for recording a time stamp counter (TSC) value of a first TSC counter of a processor before a system suspension, accessing the stored TSC value after the system suspension, and directly updating a thread offset value associated with a first thread executing on a first core of the processor with the stored TSC value, without performing a synchronization between a plurality of cores of the processor. Other embodiments are described and claimed.

24 Claims, 7 Drawing Sheets

CONTROLLING TIME STAMP COUNTER (TSC) OFFSETS FOR MULITPLE CORES AND THREADS

BACKGROUND

Many processors include a time stamp count (TSC) counter which is typically implemented as a counter that increments at a fixed rate. Some known TSC counters are clocked at a bus clock rate and a multiplier value is added each bus clock cycle. That is, if the bus clock is at 100 megahertz (MHz) and the processor is stamped for operation at 2000 MHz, a value of 20 is added to the TSC count every bus clock. In general, for a multicore processor there is a single hardware TSC counter for the number of cores present in the processor. The resolved value of the TSC for a given core is this TSC counter value plus a core offset.

Keeping TSC values for each core synchronized in a multi-socket, multi-core and multi-threaded system can be important for software. Certain software uses the TSC value as a stamp to record the order of events, e.g., in a database transaction. Having time going backwards between two processors can cause adverse results, and even can be fatal to some operations. In addition, there can be great complexity involved in enabling a TSC value to be synchronized between multiple cores.

When software is to update the TSC value for a given core, the processor reads the TSC counter and computes a new value. That is, the hardware TSC counter is never written. Because this operation is effectively writing to a moving target, the software is never guaranteed the value it could receive. That is, the various software operations to update the TSC value for a given core can be delayed indefinitely. If the delay occurs in between the software calculation of the new value and writing of this value, the calculation is invalid and the flow will have to be re-performed. Such operations can be common in a single processor system.

Greater complexity is involved in updating TSC values across multiple processors, particularly where these values need to be synchronized for correct software operation. To perform this writing of a TSC value for a core of a multiprocessor system, a more complex flow involving barriers and synchronizations. e.g., pairwise synchronization, is needed, which raises complexity and can be time consuming.

DETAILED DESCRIPTION

In various embodiments, a time stamp count (TSC) value for a given core (and/or one or more threads executing on the core) can be calculated independently of other cores. Such core TSC values may be based in part on an independent core TSC counter, along with various offsets as will be described below. To this end, reading and writing directly to a core offset can be performed, bypassing the need for synchronization between multiple cores of a multicore processor. As all cores/threads within a socket share a single hardware counter, writing directly to an offset for a core effectively allows software to update a core's offset at its leisure. Note this direct writing may be to a thread offset for each of multiple threads executing on one or more cores, as will be described in detail below. In various cases, a core TSC value can be used as a lightweight stamping mechanism to order transactions or to determine the current time of day, for example.

Figure 1:
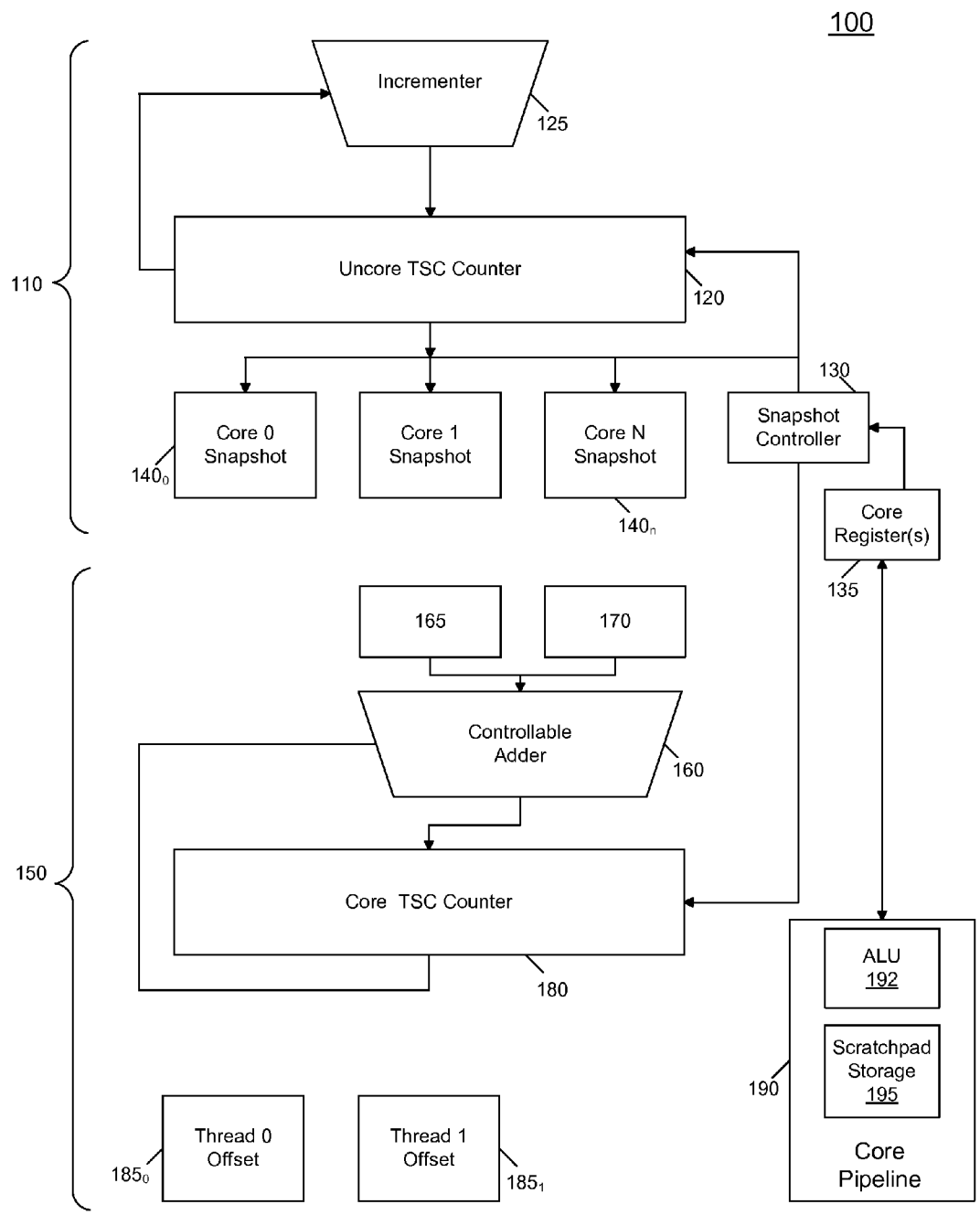
FIG. 1 is a block diagram of a portion of a processor in accordance with one embodiment of the present invention.

Referring now to FIG. 1, shown is a block diagram of a portion of a processor in accordance with one embodiment of the present invention. As shown in FIG. 1, processor 100 may include uncore logic 110 and core logic 150. In general, uncore logic 110 may include various circuitry, logic, and so forth to perform overall processor operations with regard to power management, interfacing with other components, clocking and so on. In turn, core logic 150 may include the primary execution units of the processor to execute various instructions. In many implementations, processor 100 may be a multicore processor in which a plurality of core logics 150 may be provided, although only a single uncore logic is present.

With reference to FIG. 1, primarily shown are components used for purposes of clock operations with regard to time stamp counting, and most other circuitry and logic for the processor is not shown for ease of illustration. With regard to uncore logic 110, an uncore TSC counter 120 may be provided. In general, uncore TSC counter 120 may be incremented by an incrementer 125, e.g., at a rate of a bus clock, namely a bus to which the processor is coupled. In one embodiment, this bus may be a frontside bus (FSB), although the scope of the present invention is not limited in this regard. That is, the term bus is generically used to refer to any type of interconnect, including a serial interconnect such as a point-to-point interconnect. As an example, the processor may be coupled via a point-to-point interconnect and the uncore TSC counter counts according to a common clock rate, which for purposes here may be considered a bus clock rate. The value output by uncore TSC counter 120 may be used for various operations in the uncore. In addition, as will be discussed further below the value from uncore TSC counter 120 may be used by individual cores to permit synchronization between different cores and/or threads executing on the cores.

Still referring to FIG. 1, additional circuitry may be present within uncore logic 110. Specifically, a snapshot controller 130 may be present and may be used to obtain a snapshot for one or more cores. As described below, this snapshot may be a value of the uncore TSC counter at the time of a reset of a corresponding core TSC counter. As seen, a plurality of snapshot storages $140_0$-$140_n$ may be present, each associated with a given core of the processor. Under control of snapshot controller 130 these snapshot storages may store a current value of uncore TSC counter 120, when enabled by snapshot controller 130. This value stored for a given core may correspond to the time that a TSC counter of the corresponding core logic itself was reset. That is, snapshot controller 130 may generate a reset signal to reset the TSC counter in the core concurrently with the signal to snapshot storages 140 to obtain an uncore TSC counter value. As such, the value stored in a given snapshot storage 140 may correspond to the uncore TSC counter value at reset of a given core TSC counter 180. That is, the uncore TSC counter is a reference and a snapshot is taken at the same time the core TSC counter is reset to zero. These snapshot values may provide a clean point at which to obtain a TSC value from the uncore TSC counter. Then the snapshot value for a given core can be accessed at an indeterminate time and added to the core TSC value, which acts as a reference of time to match the uncore TSC value with the core TSC value.

Regardless of the state of the cores, uncore TSC counter 120 continues to count at its determined ratio and frequency. When different cores enter and exit from different low power states (e.g., so-called C-states of the Advanced Configuration and Power Interface (ACPI) Specification rev. 4 (Jun. 16, 2009)) or other alternate frequency states, the snapshot control mechanism may be used to implement a core frequency update.

In one embodiment, processor microcode may be used to write a register, causing a snapshot to occur and then it reads the snapshot value, polling to ensure the snapshot has been effected. As seen in FIG. 1, in one embodiment this register may be one of a plurality of core registers 135 present in uncore logic 110. This write TSC instruction implemented by processor microcode may thus update a value in a corresponding register for the core in the uncore logic. In turn, this update may trigger snapshot controller 130 to effect an update for the corresponding core snapshot. Thus this control signal to snapshot controller 130 causes the current TSC value of uncore TSC counter 120 to be written into the corresponding core snapshot storage 140. At a (potentially) later time, the value read is written locally into the core. This value may be written from the snapshot storage to a corresponding storage within the core. This snapshot value is thus a static value. As described further below, an effective TSC value for a core is a sum of the core TSC value, a core offset (i.e., this core snapshot value), and a thread offset for a currently running thread.

Still referring to FIG. 1, core logic 150 is next described. In general, core logic 150 may include all the components present to perform instructions, including various storages, ordering logic, execution units, retirement logic and so forth. In the high level view of FIG. 1, such components may generally be shown as a core pipeline 190. In general a core pipeline for an out-of-order machine may include front end units to fetch and decode instructions and an out-of-order engine to reorder the instructions for execution in one or more execution units of the pipeline. The results may then be provided to back end units to reorder and retire the instructions With reference to the timing operations performed, pipeline 190 is shown to include an arithmetic logic unit (ALU) 192. However understand that many more such execution units and logic may be present within core pipeline 190. In addition, one such storage present in a core logic may be a scratchpad storage 195, which may be used to provide register-based storage for use by microcode. For example, with reference to the discussion above of the write by processor microcode to core register 135, which triggers a snapshot by a snapshot controller 130, understand that the value written to the corresponding core snapshot storage 140 may be written back to core logic 150, and more specifically may be stored in scratchpad storage 195.

In addition, core logic 150 may include a core TSC counter 180. This counter may be controlled to appear to run at a stamped frequency for the processor. This counter may be updated by a controllable adder 160. In general, core TSC counter 180 may be clocked at a given rate of a core clock frequency. In addition, at predetermined intervals one of a large and/or small adjustment value, stored in adjustment storages 165 and 170 may be added to the count value to thus increment core TSC counter 180 to provide for adjustments when the core is actually executing at a different frequency than the stamped frequency.

That is, a processor is stamped with a particular frequency, e.g., 2 gigahertz (GHz) or 3 GHz, which is the rate at which the core TSC counter is to appear to run. However, because of implementation considerations such as a turbo mode and low power states, the core may be running at a different frequency, e.g., 1 GHz, 4 GHz or other such value. For purposes of various software, the illusion that the core is running at the stamped frequency should be maintained. Because the ratio at which a core may be running versus the ratio corresponding to the stamped frequency may not be multiples of one another, these small and large adjustments can be added to the core TSC value. In one embodiment, the small adjustment can be added every X core clocks, and the large adjustment may be added, e.g., as a least common multiple of when an X core clock lines up with a bus clock. Thus, the core TSC output in general is seen as a stairstep pattern. In one embodiment, the large and small adjustments may be predetermined and programmably calculated, e.g., by processor microcode when a frequency is changed. In one embodiment, this calculation may be in accordance with Equation 1:

$$\frac{\frac{LeastCommonMultiple(CurrentRatio, 4)}{4} * StampedRatio}{\frac{LeastCommonMultiple(CurrentRatio, 4)}{CurrentRatio}} \quad [\text{Eq. 1}]$$

where StampedRatio is the stamped processor frequency and CurrentRatio is the frequency at which a core is operating.

Using Equation 1, the resulting integer quotient is the small adjustment value, and the integer remainder is the large adjustment value. For ease of discussion, these values can be calculated in a slightly simpler fashion in accordance with Equation. 2.

$$4*\text{Stamped Ratio}=(\text{Small}*\text{Current Ratio})+(\text{Large}-\text{Small}) \quad [\text{Eq. 2}]$$

In both equations, 4 is an artifact of the core TSC counter, which adds every fourth clock. This rate merely saves power by avoiding clocking the core TSC counter at a higher rate than it can be read. The correction period is the least common multiple of 4 (since a count occurs every fourth Mclk) and the current ratio divided by the current ratio, which is the greatest common denominator (GCD) of 4 and current ratio multiplied by current ratio. Note the number four is used in this implementation, but other values can be used depending on a resolution at which the TSC counter is read, balanced with the power to be saved by clocking at a lower rate. Table 1 below shows example pseudo code to calculate the large and small adjustments in accordance with an embodiment of the present invention.

TABLE 1

```
>       correctionPeriod :: (Int) -> (Int)
>       correctionPeriod (currentratio) = div (leastCommonMultiple(currentratio, 4))
currentratio
The correctioncount is the GCD of 4 and currentratio mulitpled by 4. This is
the number of 4x Mclks in each correction period.
>       correctionCount :: (Int) -> (Int)
>       correctionCount (currentratio) = div (leastCommonMultiple(currentratio, 4)) 4
The correctioncount is the correct value based off the maxratio at the correction period.
>       correctionCountAtCorrection :: (Int, Int) -> (Int)
>       correctionCountAtCorrection (currentratio, maxratio) = (correctionPeriod
(currentratio)) * maxratio
The TSC values are modulo division and remainder of the correct counter at the
correction point and the number of 4 clock periods in that correction.
>       tscValues :: (Int, Int) -> (Int, Int)
>       TSCValues (currentratio, maxratio) = (x, y)
>              wherein x = div (correctCountAtCorrection(currentratio, maxratio))
(correctionCount(currentratio))
>                     y = mod (correctCountAtCorrection(currentratio, maxratio))
(correctionCount(currentratio))
```

Note that the small and large adjustments may be adjusted responsive to the reset signal by snapshot controller 130, in some embodiments.

Figure 2:
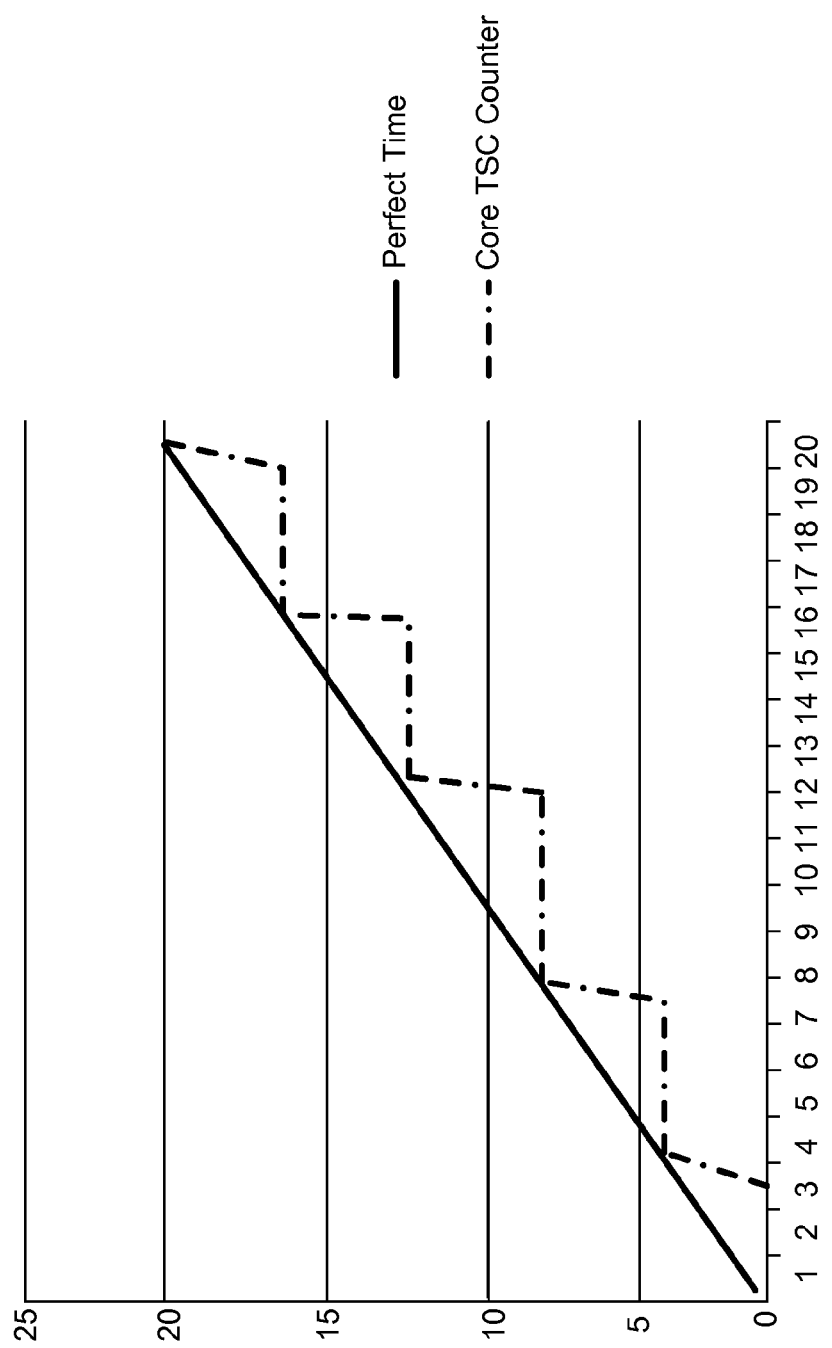
FIG. 2 is a timing diagram illustrating a comparison of a core time stamp count (TSC) counter versus real time.

In one embodiment, controllable adder 160 adds the small increment value stored in storage 170 every fourth core clock and adds the large adjustment value stored in storage 165 every fourth core clock that lines up with a bus clock. Referring now to FIG. 2, shown is a comparison of the core TSC counter versus real time. As seen, when a core is running at an odd multiple of the stamped frequency, the small increments are used at all clocks until they match up with a bus clock at which time a large adjustment occurs.

In various embodiments, the two adjustment values stored in storages 165 and 170 can be exposed to software to allow the OS to cause time to speed up marginally without having large discontinuities with time. That is, the OS or other supervisor software can program the small or large adjustment amount, allowing software to tune the core TSC counter to catch up with real time incrementally.

Still referring to FIG. 1, a plurality of thread offset storages $185_0$ and $185_1$ may be present in core logic 150, each of which may store a thread offset value. These thread offset values may correspond to an offset for a given thread between the core TSC counter value and the corresponding core offset, obtained from the corresponding core snapshot storage 140. In general, core TSC counter 180 can be used to indicate (by adding the core offset) the length of time from reset that power has been maintained to the core. The thread offset can be software controlled to supply a different perspective of time to the applications running on the core to take account for time spent in a sleep state or to adjust the value for a time of day. Note that while shown with this particular embodiment in FIG. 1, the scope of the present invention is not limited in this regard. For example, synchronization operations as discussed below can be performed in implementations without the core snapshot storages.

In one embodiment, when a read TSC instruction is executed, microcode operates to read the core TSC value and sum the core TSC value, the thread offset and the core snapshot, obtaining an effective TSC value for that thread. In some embodiments a write TSC instruction, which may be a privileged instruction, may cause microcode to sum the core snapshot plus the core TSC counter and calculate what the thread offset would need to be in order to write it to whatever value that the thread wanted, namely a user-defined value. As such, the thread offset value could be a positive or negative number. For example, if the core snapshot was 1000, the core TSC was 2000, and the program instructed a write value of 5000, the thread offset value would become 2000. Note that this write TSC operation acts as a direct write to the thread offset value. In various embodiments, instead of performing a write of the desired core TSC value and then generating a thread offset value whenever software is able to do so, direct access to the thread offset value can occur so that the desired value is directly written to the thread offset value storage. In one embodiment the thread offset value may be stored in a model specific register (MSR). Thus in these embodiments thread offset storages 185 may be implemented as MSRs. Accordingly, a write to this MSR may be performed using a write to MSR instruction. In some embodiments, supervisor software, e.g., an OS, VMM or other privileged software may be used to perform this write to the MSR.

Figure 3:
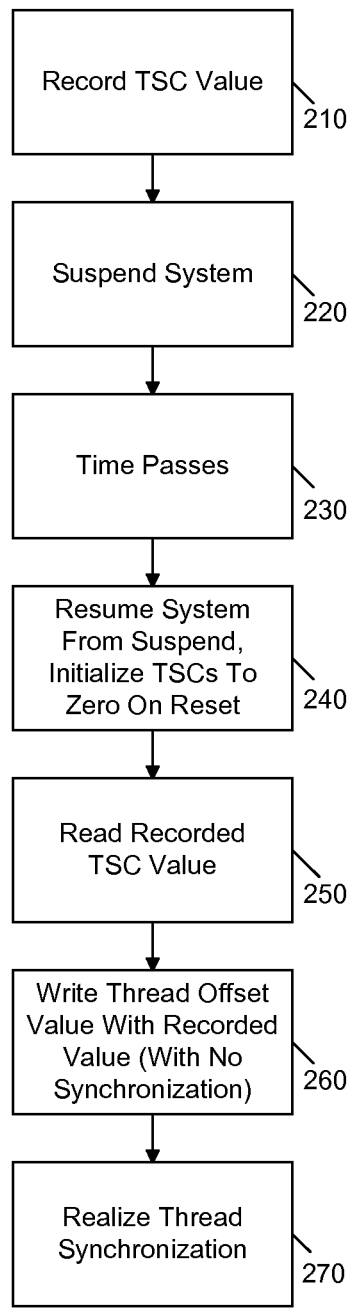
FIG. 3 is a flow diagram of a method in accordance with one embodiment of the present invention.

Thus in various embodiments, this thread offset value may be directly written, avoiding the need to perform complex and time consuming synchronization operations between multiple threads. Referring now to FIG. 3, shown is a flow diagram of a method for updating a thread offset value in accordance with one embodiment of the present invention. Note that in various embodiments, the method of FIG. 3 may be performed to enable consistency across threads and cores without a need for any barrier or synchronization operation. Method 200 may be implemented, e.g., using supervisor software such as an OS or VMM, although the scope of the present invention is not limited in this regard. In one particular implementation, a single instruction, e.g., an update TSC instruction, may cause execution of the various operations described in FIG. 3.

As seen, method 200 may begin by recording a TSC value (block 210). In some embodiments, the method of FIG. 3 may be initiated responsive to a user request for a low power state. For example, a user may select a hibernation operation (e.g., via a F4 function key on a laptop keyboard) to cause a system to enter into a standby or hibernate state. Responsive to this selection, the OS or other supervisor software may record a current uncore TSC value to a system memory or to a mass storage (e.g., disk), depending on the given low power state. Then the system may be suspended (block 220). For example, the OS may initiate a so-called S-state to place the system into a suspension state such as an ACPI S3 or S4 state in which various processor entities including both core and uncore logics may be placed in a sleep state in which power to the processor may be completely turned off.

After some amount of time passes (block 230), the system may resume from suspension (block 240). This time may conclude when a user re-initiates operation, or responsive to expiration of a platform timer. At this time, the various time stamp counters, both of the uncore and cores may be initialized to zero on reset. In various embodiments, all TSC counters may be initialized (e.g., all are reset concurrently). Still further in a multi-socket system, all sockets may be reset at the same time.

Because software that was running prior to the suspension had been reading the TSC counter and expecting that value to increase over time, the OS can restore the TSC counter, either to the value before suspension or to a current wall clock time. This decision may be made by the OS, e.g., through a control value. In one embodiment, the wall clock time may be obtained from a real time clock of the system. Thus the recorded TSC value may be read (block 250). Then this recorded TSC value (either the previously stored value or the obtained real time clock value) may be written directly to the thread offset value (block 260). In one embodiment, this thread offset value may be directly written to every thread offset storage for all active threads pending in all active cores at the time of the reset. Note that this write operation may be performed without the need for a synchronization between multiple threads and/or cores.

In this way, a thread synchronization may be realized (block 270) efficiently, without the need for barrier or other synchronization operations. With this recorded thread offset value, a given thread may then execute on a core, using the thread offset value to reflect time as seen by the thread with respect to the core TSC counter (and the uncore TSC counter). Thus at this time, normal counting operations continue with both the uncore TSC counter and the active core TSC counters beginning counting from zero. In one embodiment, at this same time core snapshot storages 140 may also be reset to zero. Thus time as seen by the various threads may be maintained by receipt of the synchronization value and the various calculations discussed above with regard to the core TSC counter value, and the thread offset value (and any updated snapshot values when a frequency is updated for a given core). For other thread offset values or for cores that are not powered up at the same time as the system, the recorded TSC value may be later written when such threads/cores begin execution. Thus, this recorded TSC value acts as a synchronization value that enables updating offsets in different threads/cores to occur at different times but receive the same synchronization value. Still further, this synchronization value can be provided at different times without the need for a synchronization/barrier operation. While shown with this particular implementation in the embodiment of FIG. 3, the scope of the present invention is not limited in this regard.

Figure 4:
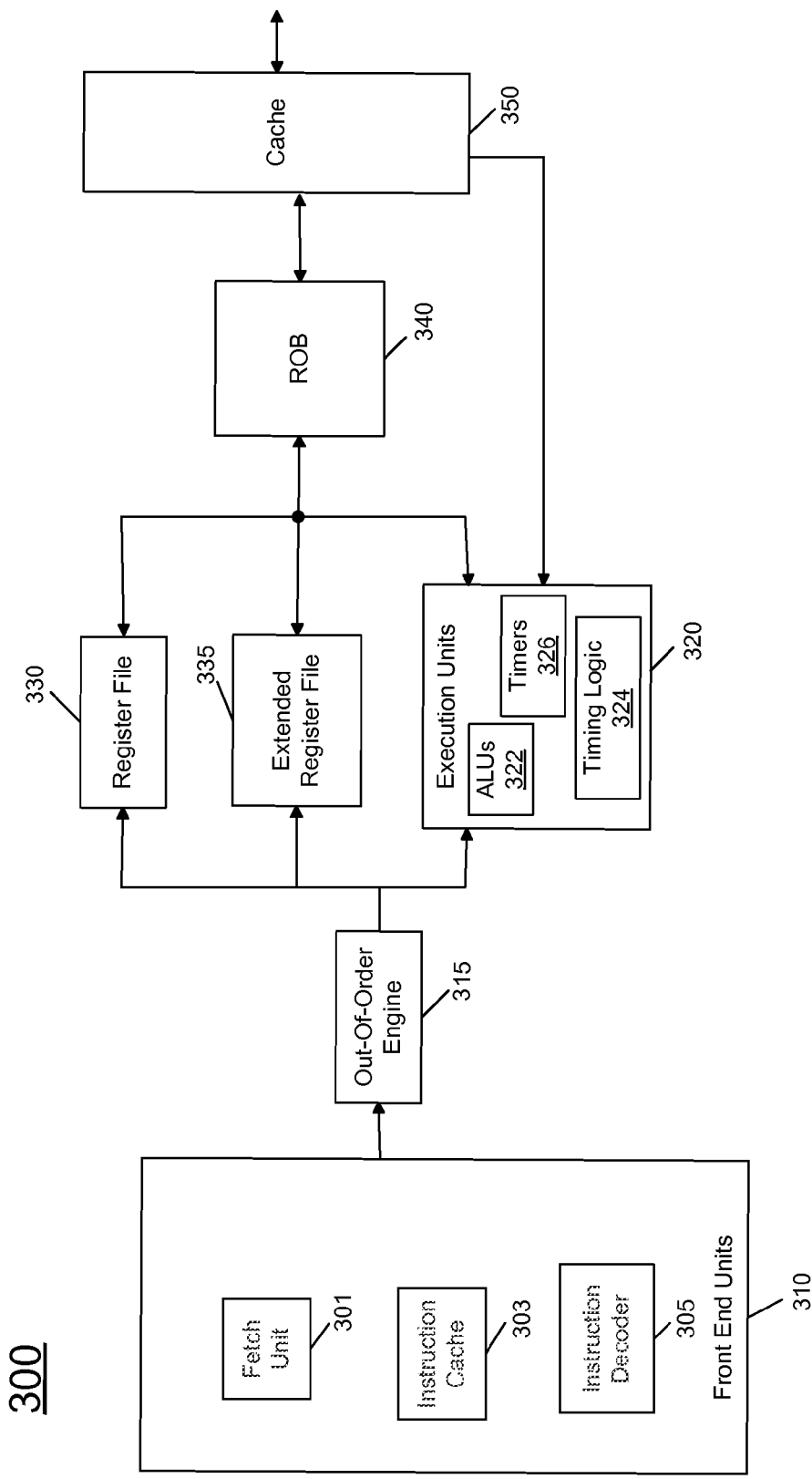
FIG. 4 is a block diagram of a processor core in accordance with one embodiment of the present invention.

Referring now to FIG. 4, shown is a block diagram of a processor core in accordance with one embodiment of the present invention. As shown in FIG. 4, processor core 300 may be a multi-stage pipelined out-of-order processor. Processor core 300 is shown with a relatively simplified view in FIG. 4 to illustrate various features used in connection with processor wait states in accordance with an embodiment of the present invention.

As shown in FIG. 4, core 300 includes front end units 310, which may be used to fetch instructions to be executed and prepare them for use later in the processor. For example, front end units 310 may include a fetch unit 301, an instruction cache 303, and an instruction decoder 305. In some implementations, front end units 310 may further include a trace cache, along with microcode storage as well as a micro-operation storage. Fetch unit 301 may fetch macro-instructions, e.g., from memory or instruction cache 303, and feed them to instruction decoder 305 to decode them into primitives, i.e., micro-operations for execution by the processor. One such instruction to be handled in front end units 310 may be a TSC update instruction in accordance with an embodiment of the present invention. This instruction may enable the front end units to access various micro-operations to enable execution of the operations such as described above associated with directly updating a thread offset value without the need for a synchronization/barrier operation.

Coupled between front end units 310 and execution units 320 is an out-of-order (OOO) engine 315 that may be used to receive the micro-instructions and prepare them for execution. More specifically OOO engine 315 may include various buffers to re-order micro-instruction flow and allocate various resources needed for execution, as well as to provide renaming of logical registers onto storage locations within various register files such as register file 330 and extended register file 335. Register file 330 may include separate register files for integer and floating point operations. Extended register file 335 may provide storage for vector-sized units, e.g., 256 or 512 bits per register.

Various resources may be present in execution units 320, including, for example, various integer, floating point, and single instruction multiple data (SIMD) logic units, among other specialized hardware. For example, such execution units may include one or more arithmetic logic units (ALUs) 322. In addition, a timing logic 324 in accordance with an embodiment of the present invention may be present. Such timing logic may be used to execute certain of the operations involved in performing TSC updates, including controlling one or more ALUs 322 and to perform various operations to directly update a thread offset value. As will be discussed further below, additional logic for handling such updates may be present in another part of a processor, such as an uncore. Also shown in FIG. 4 is a set of timers 326. Relevant timers for analysis here include a core TSC timer and various storages to provide adjustments to the timer value. Results may be provided to retirement logic, namely a reorder buffer (ROB) 340. More specifically, ROB 340 may include various arrays and logic to receive information associated with instructions that are executed. This information is then examined by ROB 340 to determine whether the instructions can be validly retired and result data committed to the architectural state of the processor, or whether one or more exceptions occurred that prevent a proper retirement of the instructions. Of course, ROB 340 may handle other operations associated with retirement.

As shown in FIG. 4, ROB 340 is coupled to a cache 350 which, in one embodiment may be a low level cache (e.g., an L1 cache) although the scope of the present invention is not limited in this regard. Also, execution units 320 can be directly coupled to cache 350. From cache 350, data communication may occur with higher level caches, system memory and so forth. While shown with this high level in the embodiment of FIG. 4, understand the scope of the present invention is not limited in this regard.

Figure 5:
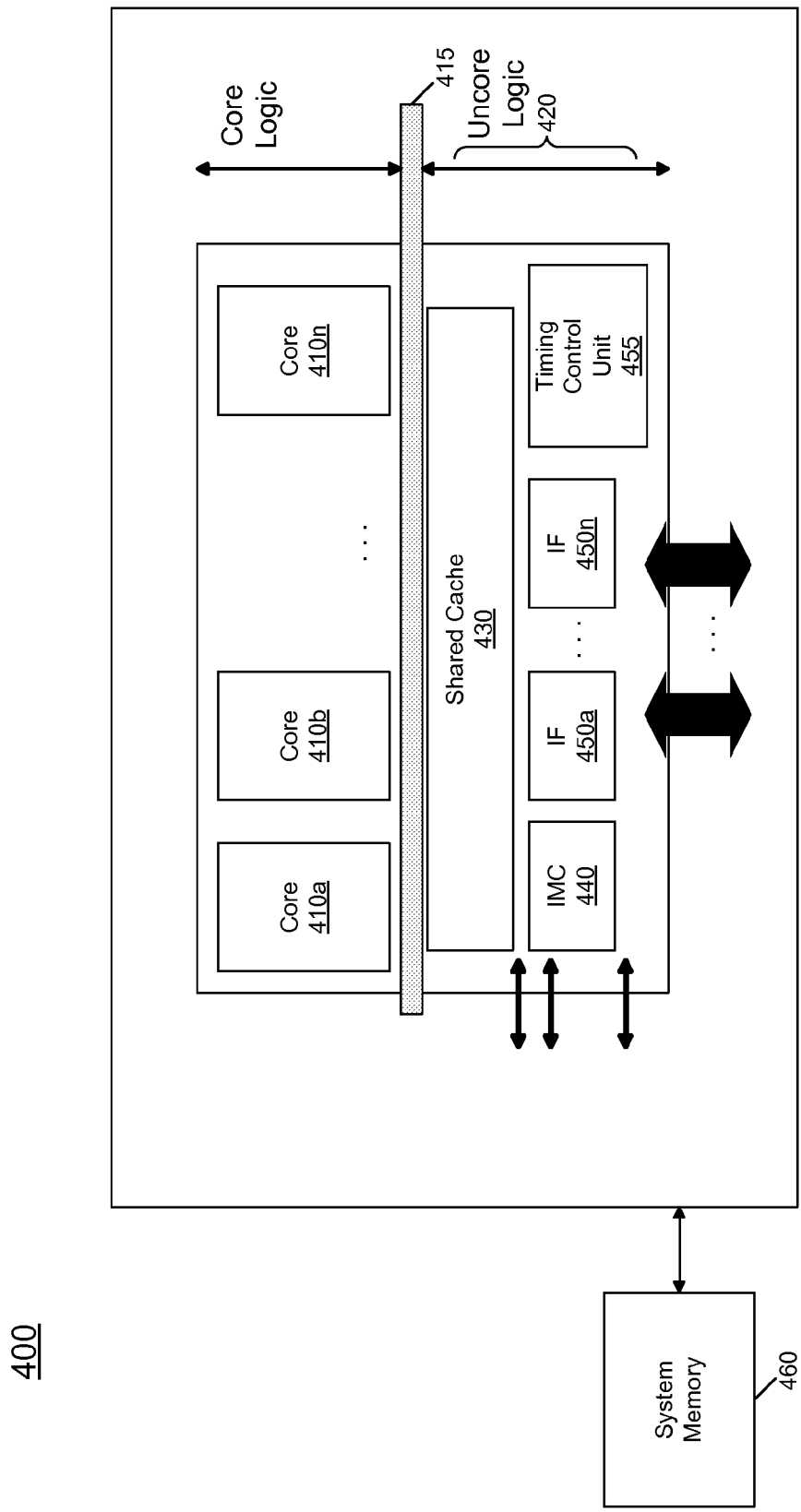
FIG. 5 is a block diagram of a processor in accordance with an embodiment of the present invention.

Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be configured as core 300 described above with regard to FIG. 4. The various cores may be coupled via an interconnect 415 to an uncore 420 that includes various components. As seen, the uncore 420 may include a shared cache 430 which may be a last level cache. In addition, the uncore may include an integrated memory controller 440, various interfaces 450 and a timing control unit 455. At least some of the functionality associated with updating core TSCs may be implemented in timing control unit 455. For example, timing control unit 455 may include the uncore TSC counter, snapshot controller and snapshot storages, such as discussed above in FIG. 1. As seen, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

In other embodiments, a processor architecture may include emulation features such that the processor can execute instructions of a first ISA, referred to as a source ISA, where the architecture is according to a second ISA, referred to as a target ISA. In general, software, including both the OS and application programs, is compiled to the source ISA, and hardware implements the target ISA designed specifically for a given hardware implementation with special performance and/or energy efficiency features.

Figure 6:
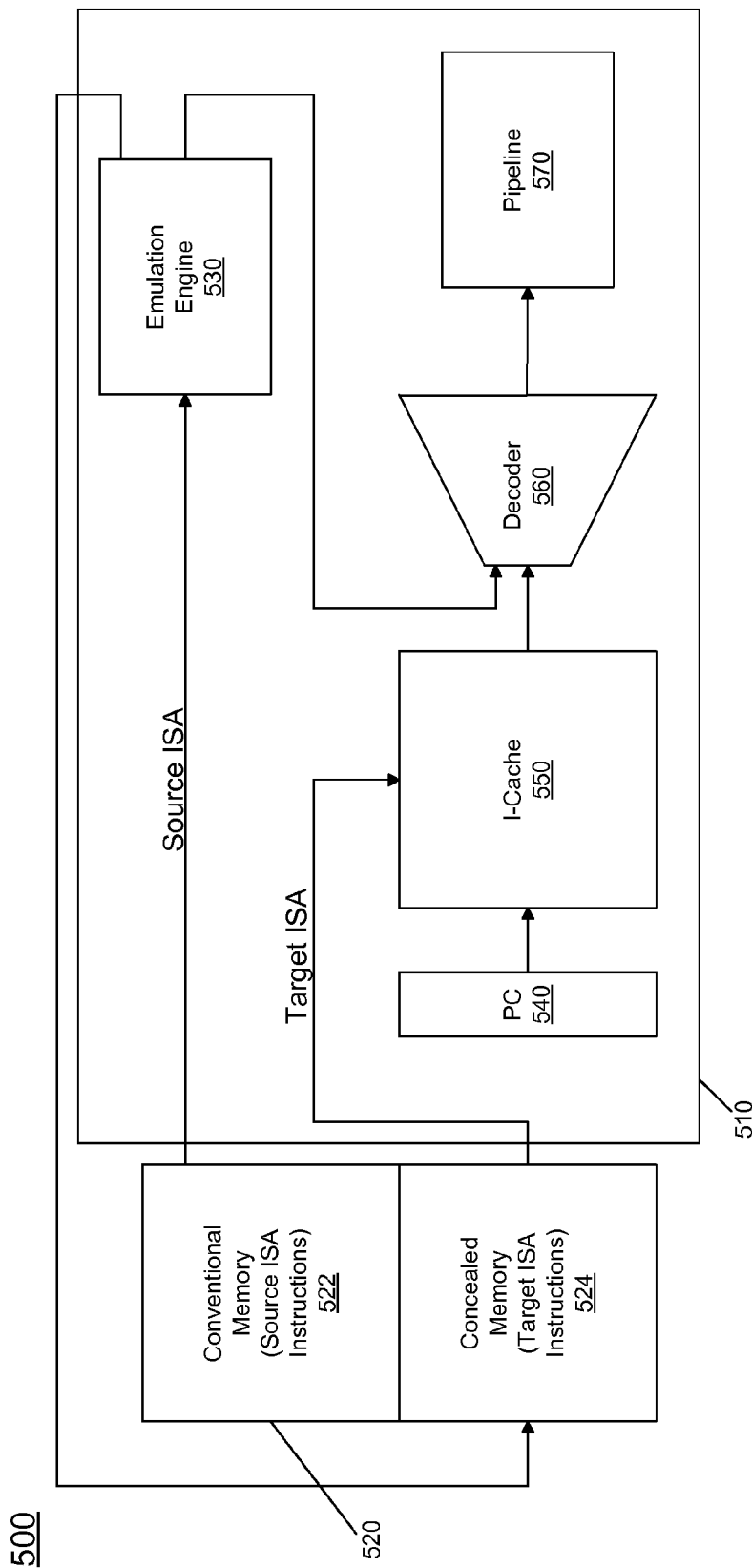
FIG. 6 is a block diagram of a processor in accordance with another embodiment of the present invention.

Referring now to FIG. 6, shown is a block diagram of a processor in accordance with another embodiment of the present invention. As seen in FIG. 6, system 500 includes a processor 510 and a memory 520. Memory 520 includes conventional memory 522, which holds both system and application software, and concealed memory 524, which holds software instrumented for the target ISA. As seen, processor 510 includes an emulation engine 530 which converts source code into target code. Emulation may be done with either interpretation or binary translation. Interpretation is often used for code when it is first encountered. Then, as frequently executed code regions (e.g., hotspots) are discovered through dynamic profiling, they are translated to the target ISA and stored in a code cache in concealed memory 524. Optimization is done as part of the translation process and code that is very heavily used may later be optimized even further. The translated blocks of code are held in code cache 524 so they can be repeatedly re-used.

Still referring to FIG. 6, processor 510, which may be one core of a multicore processor, includes a program counter 540 that provides instruction pointer addresses to an instruction cache (I-cache) 550. As seen, I-cache 550 may further receive target ISA instructions directly from concealed memory portion 524 on a miss to a given instruction address. Accordingly, I-cache 550 may store target ISA instructions which can be provided to a decoder 560 which may be a decoder of the target ISA to receive incoming instructions, which may be at the macro-instruction level and to convert the instructions to micro-instructions for execution within a processor pipeline 570. While the scope of the present invention is not limited in this regard, pipeline 570 may be an out-of-order pipeline including various stages to perform and retire instructions. Various execution units, timers, counters, and storages such as described above may be present within pipeline 570 to implement TSC update operations.

Figure 7:
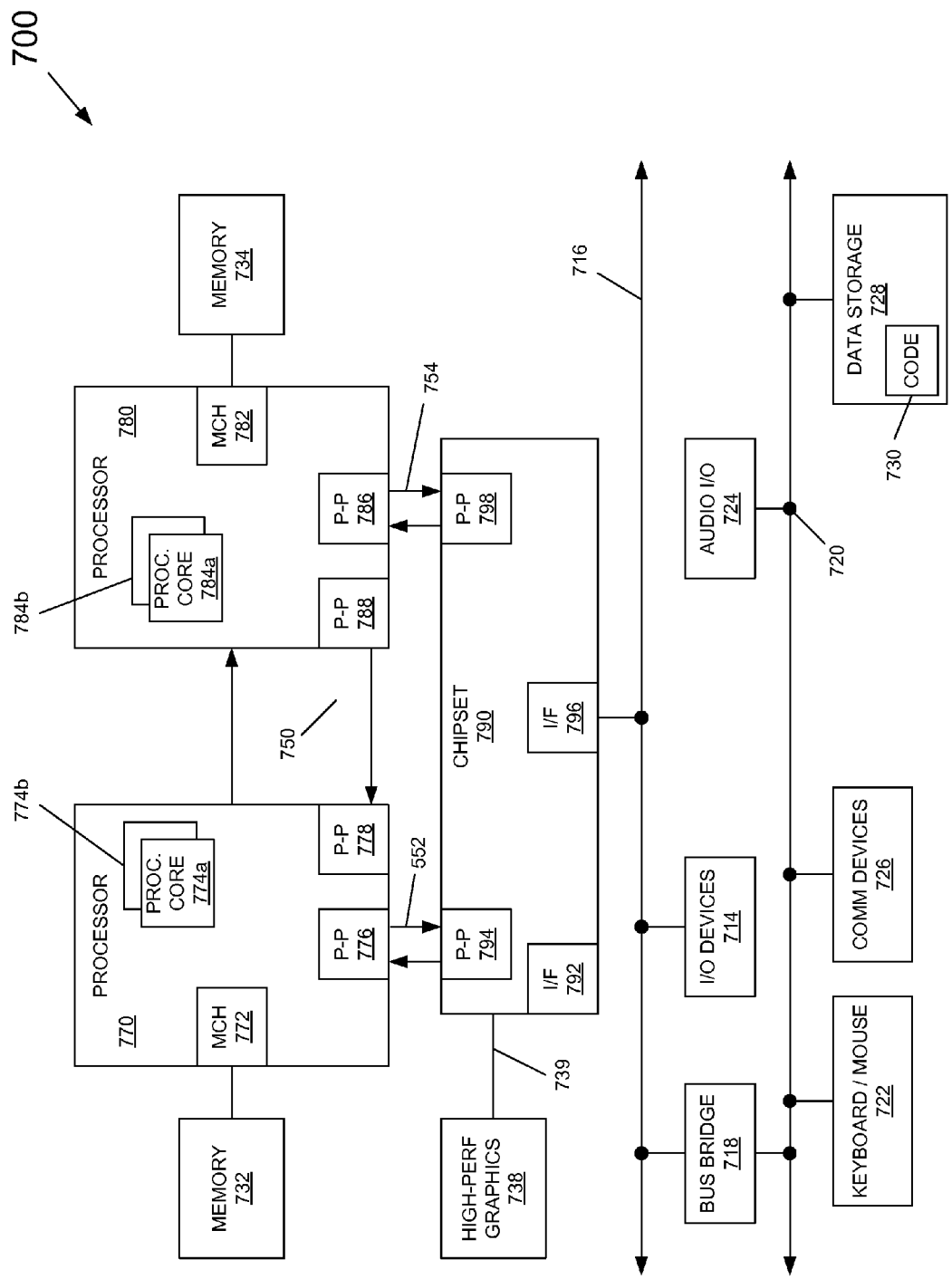
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774*a* and 774*b* and processor cores 784*a* and 784*b*), although potentially many more cores may be present in the processors. The processor cores may each include core TSC counters that can be updated for given executing threads without the need for a synchronization/barrier operation.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of main memory (e.g., a dynamic random access memory (DRAM)) locally attached to the respective processors. First processor 770 and second processor 780 may be coupled to a chipset 790 via P-P interconnects 752 and 754, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first logic including a first time stamp count (TSC) counter to count according to a bus clock frequency, a first core snapshot storage to store a value of the first TSC counter, and circuitry including a snapshot controller coupled to the first core snapshot storage to initiate storage of the value of the first TSC counter in the first core snapshot storage responsive to an indication of a system suspension; and
   a first core including a second TSC counter to count according to a core clock frequency, and a first thread offset storage to store a first thread offset value for a first thread to be executed in the first core, wherein the first thread offset value is to be directly updated with a synchronization value corresponding to the value of the first TSC counter recorded prior to occurrence of the system suspension.

2. The apparatus of claim 1, wherein the first core further comprises a second thread offset to store a second thread offset value for a second thread to be executed in the first core, wherein the second thread offset value is to be directly updated with the synchronization value.

3. The apparatus of claim 2, wherein the second thread offset value is to be updated at a different time than the first thread offset value.

4. The apparatus of claim 3, wherein the update to the first and second thread offset values is to occur without a synchronization operation between the first and second threads.

5. The apparatus of claim 1, wherein the first core further includes a first adjustment storage to store a first adjustment value and a second adjustment storage to store a second adjustment value, the first and second adjustment storages coupled to an adder coupled to the second TSC counter, wherein the adder is to apply the first adjustment value or the second adjustment value to the second TSC counter.

6. A method comprising:
responsive to a request from a processor for a system suspension, storing by a controller of the processor, a time stamp counter (TSC) value of an uncore TSC counter of the processor in a memory before the system suspension;
accessing, by the processor, a stored TSC value from the memory after the system suspension; and
executing program instructions of a first thread on a first core of the processor including instructions to update a first thread offset value that is associated with the first thread, with the stored TSC value without performing a synchronization between a plurality of cores of the processor.

7. The method of claim 6, further comprising storing, by the processor, the TSC value responsive to a user request for entry into a low power state for a system including the processor.

8. The method of claim 6, further comprising resetting, by the processor, the uncore TSC counter and a plurality of core TSC counters after exiting the system suspension, and directly updating a second thread offset value associated with a second thread executing on the first core with the stored TSC value, wherein update of the second thread offset value is performed at a different time than update of the first thread offset value.

9. The method of claim 6, further comprising directly updating, by the processor, a second thread offset value associated with a second thread executing on a second core of the processor with the stored TSC value, without performing a synchronization between the first and second cores.

10. The method of claim 6, further comprising resetting, by the processor, the uncore TSC counter and a plurality of core TSC counters upon exiting the system suspension, and recording, by the processor, a corresponding core offset value for each of the cores in a corresponding core offset storage of an uncore of the processor concurrently with the resetting.

11. The method of claim 10, further comprising synchronizing, by the processor, the plurality of core TSC counters without performing a synchronization operation between the plurality of cores.

12. The method of claim 10, wherein each of the recorded core offset values is zero upon the reset.

13. The method of claim 12, further comprising updating, by the processor, a first one of the core offset values responsive to a frequency update to the first core, and providing an updated first one of the core offset values to the first core.

14. The method of claim 13, further comprising updating, by the processor, the first thread offset value using the updated first one of the core offset values.

15. A processor comprising:
a first time stamp count (TSC) counter to count according to a bus clock frequency; and
a first core including a second TSC counter to count according to a core clock frequency, and a first thread offset storage to store a thread offset value for a first thread to be executed on the first core, wherein the thread offset value is to be directly updated with a value of the first TSC counter recorded responsive to an indication of a suspension of a system including the processor and recorded prior to the suspension of the system.

16. The processor of claim 15, further comprising a snapshot controller coupled to the first TSC counter and to a snapshot storage associated with the first core, wherein the snapshot controller is to cause the value of the first TSC counter to be stored in the snapshot storage when the second TSC counter is reset.

17. The processor of claim 16, wherein the first core includes a first logic to calculate a TSC value corresponding to a sum of a value of the second TSC counter, the thread offset value, and a value stored in the snapshot storage, responsive to a read TSC instruction.

18. The processor of claim 17, wherein the first core includes a second logic to update the thread offset value based on the value stored in the snapshot storage, the value of the second TSC counter, and a user-defined write value, responsive to a write TSC instruction.

19. The processor claim 15, wherein the processor is to reset the first TSC counter and the second TSC counter after exit from the system suspension, and directly update a second thread offset value associated with a second thread to be executed on the first core with a recorded first TSC counter value, wherein direct update of the second thread offset value is to occur at a different time than direct update of the thread offset value.

20. A system comprising:
a processor having a first time stamp count (TSC) counter to count according to a bus clock frequency, a first core including a first thread offset storage to store a first thread offset value for a first thread and a second TSC counter to count according to a core clock frequency, and a second core including a second thread offset storage to store a second thread offset value for a second thread and a third TSC counter to count according to the core clock frequency, wherein the first and second thread offset values are to be directly updated with a value of the first TSC counter recorded in response to an indication of a suspension of the system, wherein direct update of the first and second thread offset values can occur at different times; and
a dynamic random access memory (DRAM) coupled to the processor.

21. The system of claim 20, wherein the processor further includes a snapshot storage and a snapshot controller coupled to the snapshot storage.

22. The system of claim 21, wherein the snapshot controller is to cause the value of the first TSC counter to be stored in the snapshot storage when the second TSC counter is reset.

23. The system of claim 21, wherein the first core further includes a first adjustment storage to store a first adjustment value and a second adjustment storage to store a second adjustment value, the first and second adjustment storages coupled to an adder coupled to the second TSC counter, wherein the adder is to apply the first adjustment value or the second adjustment value to the second TSC counter.

24. The system of claim 20, wherein the direct update of each of the first and second thread offset values is to occur without performance of a synchronization between the first and second cores.

* * * * *